United States Patent
Giuppi et al.

(10) Patent No.: US 11,605,894 B2
(45) Date of Patent: Mar. 14, 2023

(54) GNSS ANTENNA, GNSS MODULE, AND VEHICLE HAVING SUCH A GNSS MODULE

(71) Applicant: THE ANTENNA COMPANY INTERNATIONAL N.V., Curacao (NL)

(72) Inventors: Francesco Giuppi, 's-Hertogenbosch (NL); Carlos Moreno De Jong Van Coevorden, Eindhoven (NL); Johan Leo Alfons Gielis, Antwerpen (NL); Diego Caratelli, Duizel (NL)

(73) Assignee: THE ANTENNA COMPANY INTERNATIONAL N.V., Curacao (NL)

( * ) Notice: Subject to any disclaimer, the term of this patent is extended or adjusted under 35 U.S.C. 154(b) by 871 days.

(21) Appl. No.: 16/476,450

(22) PCT Filed: Jan. 8, 2018

(86) PCT No.: PCT/NL2018/050010
§ 371 (c)(1),
(2) Date: Jul. 8, 2019

(87) PCT Pub. No.: WO2018/128546
PCT Pub. Date: Jul. 12, 2018

(65) Prior Publication Data
US 2020/0058990 A1    Feb. 20, 2020

(30) Foreign Application Priority Data
Jan. 9, 2017   (NL) .................................... 2018147

(51) Int. Cl.
*H01Q 1/36* (2006.01)
*H01Q 1/27* (2006.01)
(Continued)

(52) U.S. Cl.
CPC .............. *H01Q 9/27* (2013.01); *G01S 19/36* (2013.01); *H01Q 1/12* (2013.01); *H01Q 1/27* (2013.01);
(Continued)

(58) Field of Classification Search
CPC .. H01Q 9/27; H01Q 1/12; H01Q 1/27; H01Q 1/36; H01Q 1/50; H01Q 1/52; G01S 19/36
(Continued)

(56) References Cited

U.S. PATENT DOCUMENTS 5,170,175 A * 12/1992 Kobus ...................... H01Q 9/27
343/895
6,130,652 A * 10/2000 Goetz ....................... H01Q 1/38
343/895

(Continued)

FOREIGN PATENT DOCUMENTS

CN    105896069    8/2016

OTHER PUBLICATIONS

International Search Report and Written Opinion for PCT/NL2018/050010 dated Apr. 13, 2018.

*Primary Examiner* — Hai V Tran
(74) *Attorney, Agent, or Firm* — Renner, Otto, Boisselle & Sklar, LLP

(57) ABSTRACT

The invention relates to a Global navigation satellite systems (GNSS) antenna. The invention also relates to a Global navigation satellite systems (GNSS) module comprising at least one GNSS antenna according to the invention. The invention further relates to a vehicle, such as a car, comprising at least one GNSS module to the invention.

18 Claims, 15 Drawing Sheets

(51) Int. Cl.
    *H01Q 1/12*     (2006.01)
    *H01Q 1/50*     (2006.01)
    *G01S 19/36*    (2010.01)
    *H01Q 9/27*     (2006.01)
    *H01Q 1/52*     (2006.01)

(52) U.S. Cl.
    CPC ............... *H01Q 1/36* (2013.01); *H01Q 1/50* (2013.01); *H01Q 1/52* (2013.01)

(58) Field of Classification Search
    USPC .................................................... 342/357.76
    See application file for complete search history.

(56) References Cited

U.S. PATENT DOCUMENTS

| | | | |
|---|---|---|---|
| 6,266,027 B1 * | 7/2001 | Neel | H01Q 9/27 |
| | | | 343/749 |
| 6,407,721 B1 * | 6/2002 | Mehen | H01Q 1/36 |
| | | | 343/895 |
| 10,686,250 B1 * | 6/2020 | Oster | H01Q 1/38 |
| 2004/0056822 A1 | 3/2004 | McCarthy | |
| 2005/0104795 A1 | 5/2005 | Voigtlaender | |
| 2011/0024512 A1 | 2/2011 | Satake et al. | |
| 2012/0249385 A1 | 10/2012 | Wang | |
| 2015/0325920 A1 | 11/2015 | Urso | |

* cited by examiner

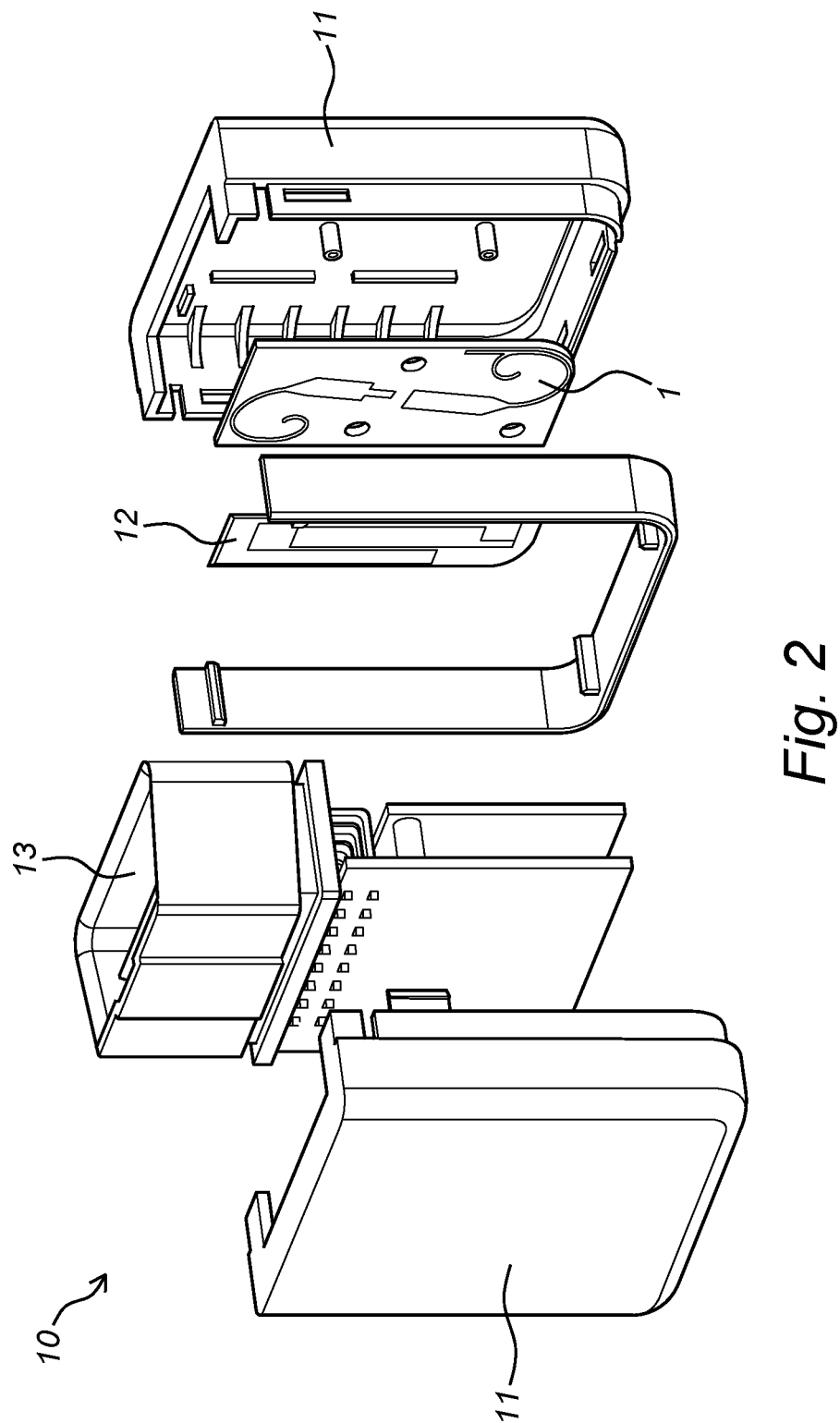

$$\frac{e^{0.2\cdot\phi}}{\left[\left(\left|\cos\left(\frac{4\cdot\phi}{4}\right)\right|\right)^{1000}+\left(\left|\sin\left(\frac{4\cdot\phi}{4}\right)\right|\right)^{1000}\right]^{\frac{1}{1000}}}$$

$$\frac{e^{0.2\cdot\phi}}{\left[\left(\left|\cos\left(\frac{10\cdot\phi}{4}\right)\right|\right)^{5}+\left(\left|\sin\left(\frac{10\cdot\phi}{4}\right)\right|\right)^{5}\right]^{\frac{1}{5}}}$$

GNSS ANTENNA, GNSS MODULE, AND VEHICLE HAVING SUCH A GNSS MODULE

This application is a national phase of International Application No. PCT/NL2018/050010 filed Jan. 8, 2018, and claims priority to Netherlands Application No. 2018147 filed on Jan. 9, 2017, which is incorporated herein by reference.

The invention relates to a Global navigation satellite systems (GNSS) antenna. The invention also relates to a Global navigation satellite systems (GNSS) module comprising at least one GNSS antenna according to the invention. The invention further relates to a vehicle comprising at least one GNSS module to the invention.

Global navigation satellite systems (GNSS) have become very commonly used devices. Well known uses include automobile and truck navigation systems and military applications. The rapid growth of GNSS technology also includes a growing list of new applications, some examples of which include: vehicle and package tracking, child monitoring, surveying, construction, sports equipment, workforce management, and farming. Along with the growth of applications, there are a growing number of GNSS, such as GPS (United States), GLONASS (Russia), Galileo (Europe), and Beidou (China), each GNSS with its own typical operating frequency. For example, GPS currently operates using the L1 (1575 MHz) and L2 (1227 MHz) bands.

Antennas are a critical part of any GNSS device, whereas the antenna needs to receive signals from as many satellites as possible. Optimal performance will commonly not be available in narrow streets and underground parking lots or if objects cover the antenna. Poor visibility may result in position drift or a prolonged Time-To-First-Fix (TTFF). There is a continuous need to improve the performance e.g. in terms of radiation uniformity and efficiency.

It is an object of the invention to provide a GNSS antenna with an improved performance.

To this end, the invention provides a GNSS antenna, comprising: at least one dielectric support substrate having a front surface and a rear surface; at least two radiation structures attached to the front surface of said support substrate, each radiation structure comprising: a feeding section configured to be connected to an external feeding structure, and at least one substantially spiral-shaped section connected to said feeding section, wherein the feeding sections of the radiation structures are facing each other, and wherein at least two radiation structures are positioned at a distance from each other; and, preferably, at least one parasitic structure attached to the rear surface of said support substrate. In the antenna according to the invention, each (conductive) radiation structure acts as antenna pole. Hence, the antenna may be classified as a (non-conventional) multipole antenna. Experiments have surprisingly shown that by applying substantially spiral-shaped radiation sections instead of linear radiation sections, a significantly better performance of the GNSS antenna as such can be achieved. Within the typical GNSS frequency bands, such as the Beidou frequency band (1.561 GHz), the GPS frequency band (1.575 GHz), and the Glonass frequency band (1.601 GHz), the antenna according to the invention exhibits an efficiency increase of no less than 55% compared to conventional GNSS antennas. Within these GNSS bands, due to the spiral shape of the radiation structure, the antenna according to the invention achieves an efficiency of approximately 70%, while conventional GNSS antennas have a relatively poor maximum efficiency of approximately 45%. Moreover, the application of spirally shaped sections leads, compared to conventional GNSS antennas, to a relatively uniform and relatively omnidirectional radiation patterns in the phi=0 degrees plane, the phi=90 degrees plane, and the theta=90 degrees plane. Preferably, the design of at least two radiation structures is substantially identical. Using bilaterally symmetrical radiation structures commonly leads to the best increase in performance. Although it is imaginable that each feeding section is connected or configured to be connected to its own (distinctive) external feeding structure, commonly all radiation structures configured to resonate within one or more GNSS frequency bands, are typically connected to the same (shared) feeding structure. The external feeding structure may be, for example, comprise a coaxial cable. The feeding structure is used to connect the GNSS radiation structures of the antenna to a GNSS receiver. Preferably, at least two radiation structures together form a layout, said layout having an n-fold rotational symmetry, wherein n≥2 and/or wherein n is equal to the number of (GNSS) radiation structures used in the antenna. It is conceivable that more than two radiation structures are applied. In case more than two radiation structures would be applied, it is imaginable that all radiation structures are configured to operate within one or more GNSS frequency bands. Alternatively, in case more than two radiation structures would be applied, it is also imaginable that at least two radiation structures are configured to operate within one or more GNSS frequency bands, while one, two or more other radiation structures are configured to operate within one or more alternative frequency bands, such as WiFi (2.4 GHz/5 GHz bands), WiGig (2.4 GHz/5 GHz/60 GHz bands), CBRS (3.5 GHz band), or cellular (GSM/UMTS/LTE). In this latter, case the GNSS antenna is provided multiple functionalities.

The substantially spiral-shaped design of each radiation structure preferably has a smooth curvature, which is commonly in favour of the resonance capacity of the radiation structure. This commonly results in the generation of relatively predictable and reliable antenna signals during operation of the GNSS.

The substantially spiral-shaped section of at least one, and preferably each, radiation structure has a substantially spiral-shaped design. This means that this substantially spiral-shaped design, has the design of a curve which emanates from a (fixed or moving) center point, moving farther away as it revolves around said center point. This curve is commonly a planar curve, as the radiation structures are commonly planar (flat). The—practically—two-dimensional spirals shaped this way may be described most easily using polar coordinates, where the radius r is a monotonic continuous function of angle $\vartheta$. The circle would be regarded as a degenerate case (the function not being strictly monotonic, but rather constant).

Preferably, the substantially spiral-shaped section of at least one radiation structure has the shape of a polynomial spiral. Here, a polynomial is an expression consisting of variables (or indeterminates) and coefficients, that involves typically the operations of addition, subtraction, multiplication, and non-negative integer exponents. More preferably, the substantially spiral-shaped section of at least one radiation structure has the shape of a polynomial spiral for which the curvature is a polynomial function of the arc length s. A polynomial function is a function that can be defined by evaluating a polynomial, including polynomial spirals. The change of the angle versus the arc length s along the curve is defined as $$\frac{d\vartheta}{ds}.$$

Examples are the Logarithmic spiral $\rho = a \cdot e^{b\vartheta}$ with $$\frac{d\vartheta}{ds} = \frac{1}{s}$$

(i.e. the change is related to the inverse of the arc length), and the Cornu-Euler spiral with $$\frac{d\vartheta}{ds} = s$$

(i.e. the change is directly proportional to the arc length). More generally $$\frac{d\vartheta}{ds}.$$

can be a polynomial function of the arc length. This type of spiral shape is also known as a polynomial or Dillen spiral. Here, it can be advantageous that the substantially spiral-shaped section of at least one radiation structure has the shape of a polynomial spiral for which the curvature changes substantially linearly with the arc length. This type of spiral shape is also known as Cornu spiral, Euler spiral, and is also referred to as spiros or clothoid.

The spiral-shaped design of at least one, and preferably all, substantially spiral-shaped section to be applied in the GNSS antenna according to the invention, preferably complies with at least one of the following generalizations:

In a first preferred generalization, the length of the radius vector can vary in length periodically, in particular via Gielis transformations, whereby $f(\vartheta) = \rho = e^{b\vartheta}$, the logarithmic spiral, or $f(\vartheta) = \rho = a\vartheta$, the Archimedean spiral, or a Cornu spiral defined by $$r = \frac{a}{s}$$

with r the radius of curvature, a constant and s arc length, or equivalently by the Fresnel integrals $x = +\int_0^t \cos(s^2)ds$ and $y = \int_0^t \sin(s^2)ds$:

$$\varrho(\vartheta; f(\vartheta), m, A, B, n_1, n_2, n_3) = \frac{1}{\sqrt[n_1]{\left|\frac{1}{A}\cos\left(\frac{m}{4}\vartheta\right)\right|^{n_2} \pm \left|\frac{1}{B}\sin\left(\frac{m}{4}\vartheta\right)\right|^{n_3}}} f(\vartheta)$$

Wherein:

$$A, B, n_1 \in \mathbb{R}_0^+; m, n_{1,2} \in \mathbb{R}$$

In a second preferred generalization, the rotation of the radius vector, in general assumed at constant angular velocity, can be also a variable function instead of a constant one. Here, the substantially spiral-shaped section of at least one radiation structure preferably has the shape of a polynomial spiral for which the curvature changes substantially linearly with the arc length of the spiral. This can be encoded directly in Gielis transformations with $g_{1,2}(\vartheta)$ and with $f(\vartheta) = \rho = e^{b\vartheta}$, or the Archimedean spiral, or Cornu spiral:

$$\varrho(\vartheta; f(\vartheta), A, B, n_1, n_2, n_3) = \frac{1}{\sqrt[n_1]{\left|\frac{1}{A}\cos\left(\frac{m}{4}g_1(\vartheta)\right)\right|^{n_2} \pm \left|\frac{1}{B}\sin\left(\frac{m}{4}g_2(\vartheta)\right)\right|^{n_3}}} f(\vartheta)$$

where $\vartheta \in [-\pi, \pi]$, $g_1$, $g_2$ and $f(\vartheta)$ are continuous functions; m, A and B are real positive numbers and $n_1$, $n_2$, $n_3$ are integers or real numbers. The above mathematical formula represents a polynomial function. The functions $g_1(\vartheta)$ and $g_1(\vartheta)$ are two planar functions, for example:

$$g_1 = 2arc\,\sin(\vartheta/\pi) \text{ and } g_2 = \pi(\vartheta/\pi)^3$$

In a third preferred generalization, the curve traced out by the position vector is of zero width, but can be given a width, which can be either constant or variable, periodic along the curve, or as some function of arc length in general.

Although commonly relatively flat substantially spiral-shaped sections are applied, having a height of (much) less than 1 mm, leading to a 2D-structure of the GNSS antenna, it may, however, also be conceivable to provide one or more substantially spiral-shaped sections a greater thickness than 1 mm, leading to a 3D-structure of the GNSS antenna. The thickness of a substantially spiral-shaped section may either be constant or may vary across the section.

Preferably at least one, and more preferably each, radiation structure comprises at least one fine frequency tuning branch connected to the substantially spiral-shaped section of said radiation structure. The application of one or more tuning branches per radiation structure may significantly increase the accuracy of the GNSS antenna to operate within one or more desired GNSS frequency bands. The fine frequency tuning branch preferably has a substantially linear design. The fine frequency tuning branch preferably smoothly connects to the substantially spiral-shaped section. This connection is commonly seamless, wherein the substantially spiral-shaped section and at least one tuning branch are mutually integrated and formed out of a single piece (of conductive material). The smooth connection is preferably realised by extending a position-selective direction of a specific part of the substantially-spiral shaped design, resulting in a substantially linearly extending tuning branch. The length of at least one tuning branch is preferably between (and including) 1.5 and 9.5 mm, more preferably between (and including) 5.5 and 7.5 mm, and most preferably between (and including) 5.0 and 6.0 mm. The maximum diameter of the substantially spiral-shaped section of at least one radiation structure is preferably situated between 8 and 9 mm.

The maximum width of the feeding section of at least one radiation structure is preferably larger than the width of the substantially spiral-shaped section of said radiation structure. This increased width of the feeding section will facilitate connecting the external feeding structure to said feeding section. Preferably, the width at least a part of the feeding section of at least one radiation structure decreases in the direction of the substantially spiral-shaped section of said radiation structure. Preferably, the minimum width of the feeding section substantially corresponds with the width of the substantially spiral-shaped section. Here, the feeding section is more preferably provided with a tapered end section allowing the feeding section to be smoothly connected to the substantially spiral-shaped section. Each radiation structure is preferably made out of single piece, wherein hence the feeding section and one or more substantially spiral-shaped sections are seamlessly connected to each other.

The substantially spiral-shaped structures and the feeding structures are substantially completely made of at least one electrically conductive material, preferably made at least one metal. Commonly, copper is used, optionally covered by a protective conductive coating, such as a tin coating.

The support substrate may either by a 2D-structure or a 3D-structure. Preferably, the support substrate is formed by a printed circuit board (PCB). A PCB commonly has a 2D-structure.

The support substrate may be provided with at least one through-hole for mechanically fixing, e.g. by means of screws, the GNSS antenna to another object, such as a (antenna) housing.

The at least one parasitic structure preferably comprises a substantially linear section and at least one substantially spiral-shaped structure to each end of said linear section. More preferably, the design of at least one substantially spiral-shaped structure of the parasitic structure substantially corresponds to the design of the substantially spiral-shaped structure of at least one radiation structure. Since the layout of the radiation structures typically comprises a double spiral, also the parasitic structure preferably also comprises a double spiral, also referred to as spiral flares. The presence of the parasitic double spiral trace on the rear surface of the support substrate, opposite to the typical spiral-shaped dipole applied on the front surface of the support surface, creates a guiding stripline effect which permits to isolate the GNSS antenna from other metal components in the direct surroundings. The guided field is then radiated through the spiral acting as "leaky-wave" structure. The at least one parasitic structure is preferably substantially completely made of at least one electrically conductive material, preferably made at least one metal, such as copper, optionally covered by a tin coating.

The GNSS antenna according to the invention may either be a passive antenna or an active antenna. Passive antennas merely comprises the radiation structures, and possibly also a passive matching network to match the electrical connection to a predefined impedance, typically 50 Ohms. Active antennas need a power supply that will contribute to GNSS antenna power consumption, typically in the order of 3 to 20 mA. Usually, the supply voltage is fed to the GNSS antenna through a coaxial (RF) cable. Usually an active GNSS antenna includes a GNSS band pass filter that filters out the desired GNSS signal. In combined GPS & GLONASS antennas, for example, the antenna is tuned for receiving both signals and the filter has a larger bandwidth to provide optimal GPS & GLONASS signal reception. Active antennas typically also comprise an integrated Low-Noise Amplifier (LNA). This is beneficial in two respects. First, the losses of the cable after the LNA no longer affect the overall noise figure of a GNSS receiving module comprising a GNSS antenna according to the invention. Secondly, the LNA in the antenna helps to reduce the overall noise figure of the GNSS module resulting in a better sensitivity. Some GNSS receivers are designed such that they will only work with active GNSS antennas.

It is imaginable that the GNSS antenna comprises more than two radiation structures. All of these radiation structures may be configured to allow the GNSS antenna to operate as wideband antenna. It is, however, also imaginable that different radiation structures allow the GNSS antenna to operate in different frequency bands, preferably at least one GNSS frequency band and at least one frequency band chosen from the group consisting of: the Cellular GSM frequency band, LTE frequency band, WCDMA frequency band, and/or Wi-Fi frequency band. Here, for example, two radiation structures may be configured to operate within a GNSS frequency band, while one, two or more other radiation structures (also applied onto the support substrate) may be configured to operate within another frequency band.

The invention also relates to a GNSS module, in particular a GNSS receiving module, comprising at least one GNSS antenna according to the invention, and at least one housing for mounting said GNSS antenna. The housing is preferably substantially sealed in a substantially water tight manner in order to protect the GNSS antenna against moisture. The housing is commonly provided with a connector, connected to said GNSS antenna, in order to use the GNSS module as plug-in module in e.g. vehicles, like cars and (motor)cycles. The GNSS module may also comprise at least one additional antenna configured to operate within the GSM frequency band, wherein said additional antenna is also mounted by said housing. Here, the GNSS antenna and the additional antenna configured to operate within the GSM frequency band are preferably positioned at a distance from each other, more preferably a distance of at least 5 mm in order to counteract interference.

The invention further relates to a vehicle comprising at least one GNSS module according to the invention. Examples of vehicles are cars, (motor)cycles, trains, boats, and aircrafts.

The invention may further be expressed through any of the following non-limitative clauses:

1. GNSS antenna, comprising:
    at least one dielectric support substrate having a front surface and a rear surface;
    at least two radiation structures attached to the front surface of said support substrate, each radiation structure comprising:
        a feeding section configured to be connected to an external feeding structure, and
        at least one substantially spiral-shaped section connected to said feeding section,
            wherein the feeding sections of the radiation structures are facing each other, and wherein at least two radiation structures are positioned at a distance from each other; and
    preferably, at least one parasitic structure attached to the rear surface of said support substrate.
2. GNSS antenna according to clause 1, wherein the design of at least two radiation structures is substantially identical.
3. GNSS antenna according to clause 1 or 2, wherein at least two radiation structures together form a layout, said layout having an n-fold rotational symmetry, wherein n≥2.
4. GNSS antenna according to one of the foregoing clauses, wherein the substantially spiral-shaped design of each radiation structure has a smooth curvature.
5. GNSS antenna according to one of the foregoing clauses, wherein the substantially spiral-shaped section of at least one radiation structure has the shape of a polynomial spiral.
6. GNSS antenna according to clause 5, wherein the substantially spiral-shaped section of at least one radiation structure has the shape of a polynomial spiral for which the curvature is a polynomial function of the arc length.
7. GNSS antenna according to clause 6, wherein the substantially spiral-shaped section of at least one radiation structure has the shape of a polynomial spiral for which the curvature changes substantially linearly with the arc length.

8. GNSS antenna according to one of the foregoing clauses, wherein the substantially spiral-shaped section of at least one radiation structure has the shape of a polynomial spiral, for which the curvature changes preferably substantially linearly with the arc length, and wherein the rotation of a radius vector of the polynomial spiral complies with the (polynomial) formula:

$$\varrho(\vartheta) = \frac{1}{\sqrt[n_1]{\left|\frac{1}{A}\cos\left(\frac{m}{4}g_1(\vartheta)\right)\right|^{n_2} \pm \left|\frac{1}{B}\sin\left(\frac{m}{4}g_2(\vartheta)\right)\right|^{n_3}}} f(\vartheta)$$

wherein:

$A, B, n_1 \in \mathbb{R}_0^+; m\ n_{1,2} \in \mathbb{R}$; and $f(\vartheta) = e^{b\vartheta}$ 9. GNSS antenna according to one of clauses 5-8, wherein the substantially spiral-shaped section of at least one radiation structure has the shape of a polynomial spiral for which the curvature changes substantially periodically with the arc length.

10. GNSS antenna according to one of the foregoing clauses, wherein at least one radiation structure comprises at least one fine frequency tuning branch connected to the substantially spiral-shaped section of said radiation structure.

11. GNSS antenna according to clause 10, wherein said fine frequency tuning branch has a substantially linear design.

12. GNSS antenna according to clause 10 or 11, wherein said fine frequency tuning branch smoothly connects to the substantially spiral-shaped section.

13. GNSS antenna according to one of clauses 10-12, wherein the length of at least one fine frequency tuning branch is situated between 5 and 6 mm.

14. GNSS antenna according to one of the foregoing clauses, wherein the maximum diameter of the substantially spiral-shaped section of at least one radiation structure is situated between 8 and 9 mm.

15. GNSS antenna according to one of the foregoing clauses, wherein the maximum width of the feeding section of at least one radiation structure is larger than the width of the substantially spiral-shaped section of said radiation structure.

16. GNSS antenna according to one of the foregoing clauses, wherein the width at least a part of the feeding section of at least one radiation structure decreases in the direction of the substantially spiral-shaped section of said radiation structure.

17. GNSS antenna according to clause 16, wherein the minimum width of the feeding section substantially corresponds with the width of the substantially spiral-shaped section.

18. GNSS antenna according to one of the foregoing clauses, wherein the radiation structures are substantially completely made of at least one electrically conductive material, preferably made at least one metal.

19. GNSS antenna according to one of the foregoing clauses, wherein the support substrate is formed by a printed circuit board (PCB).

20. GNSS antenna according to one of the foregoing clauses, wherein the support substrate is provided with at least one through-hole for fixing the GNSS antenna to another object, such as a housing.

21. GNSS antenna according to one of the foregoing clauses, wherein the GNSS antenna has a substantially 2D-structure.

22. GNSS antenna according to one of the foregoing clauses, wherein the at least one parasitic structure preferably comprises a substantially linear section and at least one substantially spiral-shaped structure to each end of said linear section.

23. GNSS antenna according to clause 22, wherein the design of at least one substantially spiral-shaped structure of the parasitic structure substantially corresponds to the design of the substantially spiral-shaped structure of at least one radiation structure.

24. GNSS antenna according to clause 23, wherein the design of the at least one parasitic structure at least partially, and preferably substantially completely, corresponds to the design of the assembly of radiation structures.

25. GNSS antenna according to one of the foregoing clauses, wherein the at least one parasitic structure is substantially completely made of at least one electrically conductive material, preferably made at least one metal.

26. GNSS antenna according to one of the foregoing clauses, wherein the GNSS antenna comprises at least one band pass filter.

27. GNSS antenna according to one of the foregoing clauses, wherein the GNSS antenna comprises at least one low-noise amplifier (LNA).

28. GNSS antenna according to one of the foregoing clauses, wherein the GNSS antenna comprises more than two radiation structures.

29. GNSS antenna according to one of the foregoing clauses, wherein the radiation structures allow the GNSS antenna to operate as wideband antenna.

30. GNSS antenna according to one of the foregoing clauses, wherein the radiation structures allow the GNSS antenna to operate in different frequency bands, preferably at least one GNSS frequency band and at least one frequency band chosen from the group consisting of: the Cellular GSM frequency band, LTE frequency band, WCDMA frequency band, and/or Wi-Fi frequency band.

31. GNSS module, comprising at least one GNSS antenna according to one of the foregoing clauses, and at least one housing for mounting said GNSS antenna.

32. GNSS module according to clause 31, wherein the GNSS module comprises at least one additional antenna configured to operate within the GSM frequency band, wherein said additional antenna is also mounted by said housing.

33. GNSS module according to clause 32, wherein the GNSS antenna and the additional antenna configured to operate within the GSM frequency band are positioned at a distance from each other, preferably a distance of at least 5 mm.

34. Vehicle comprising at least one GNSS module according to one of clauses 31-34.

The invention will be elucidated on the basis of non-limitative exemplary embodiments shown in the following figures. Herein:

FIG. 2 shows an exploded view of a GNSS module comprising a GNSS antenna according to FIGS. 1a and 1b;

Figure 1A:
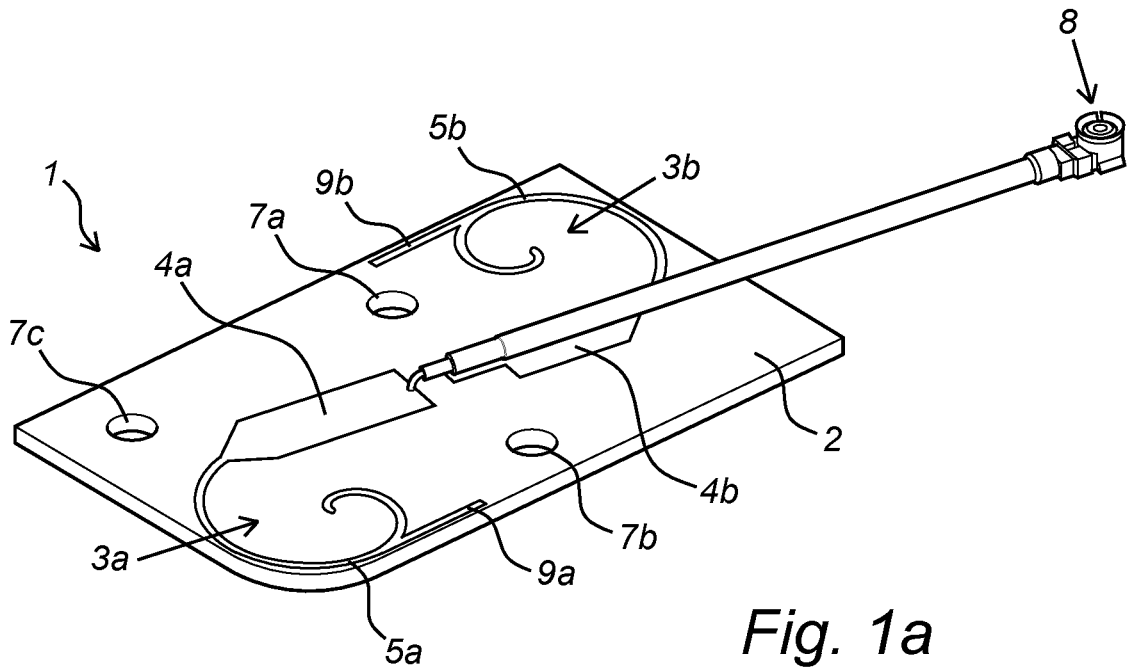
FIGS. 1a and 1b show a perspective view of a GNSS antenna according to the invention.
Figure 1B:
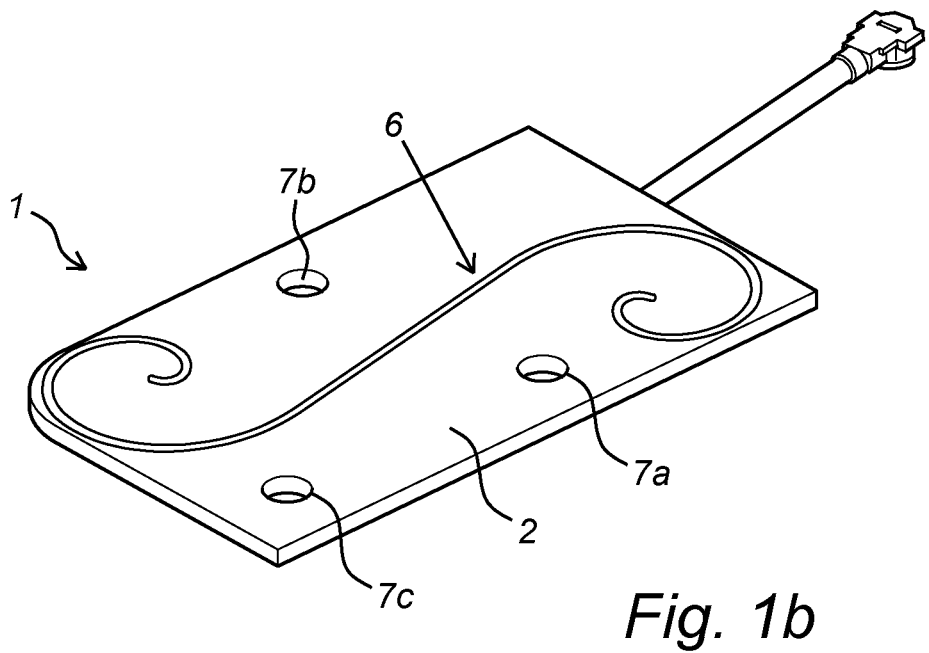
Figure 4A:
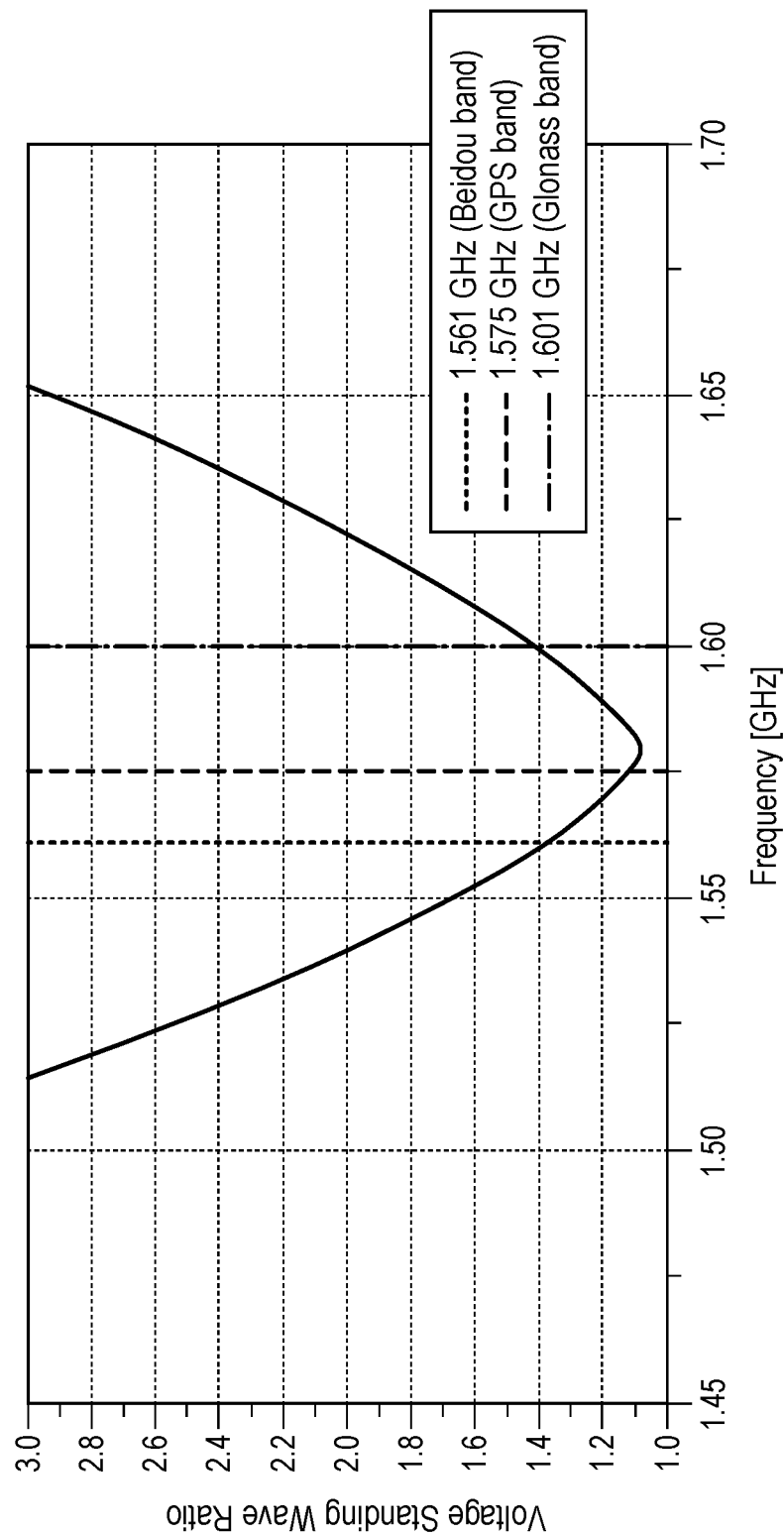
Figure 4B:
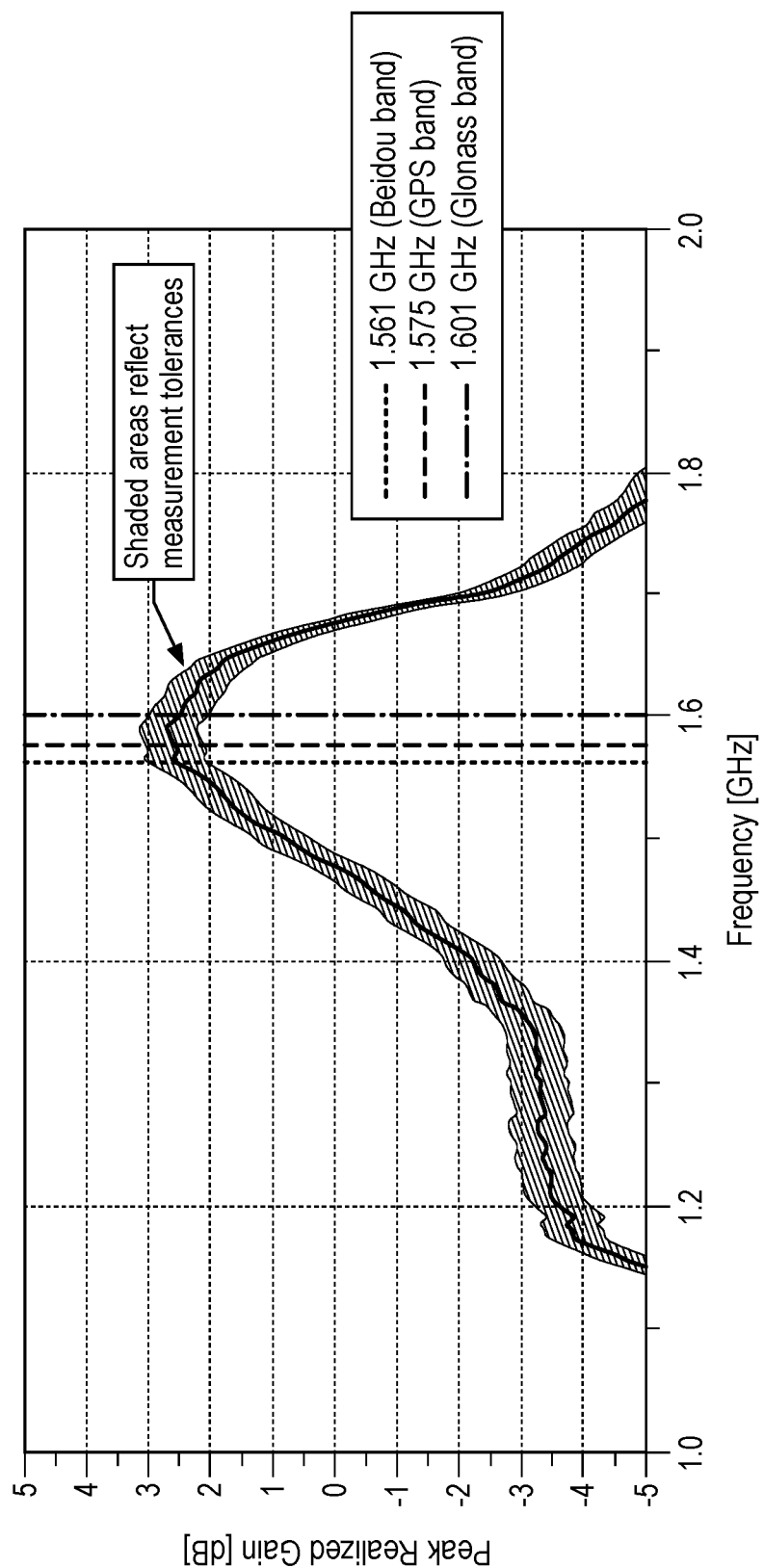
Figure 4C:
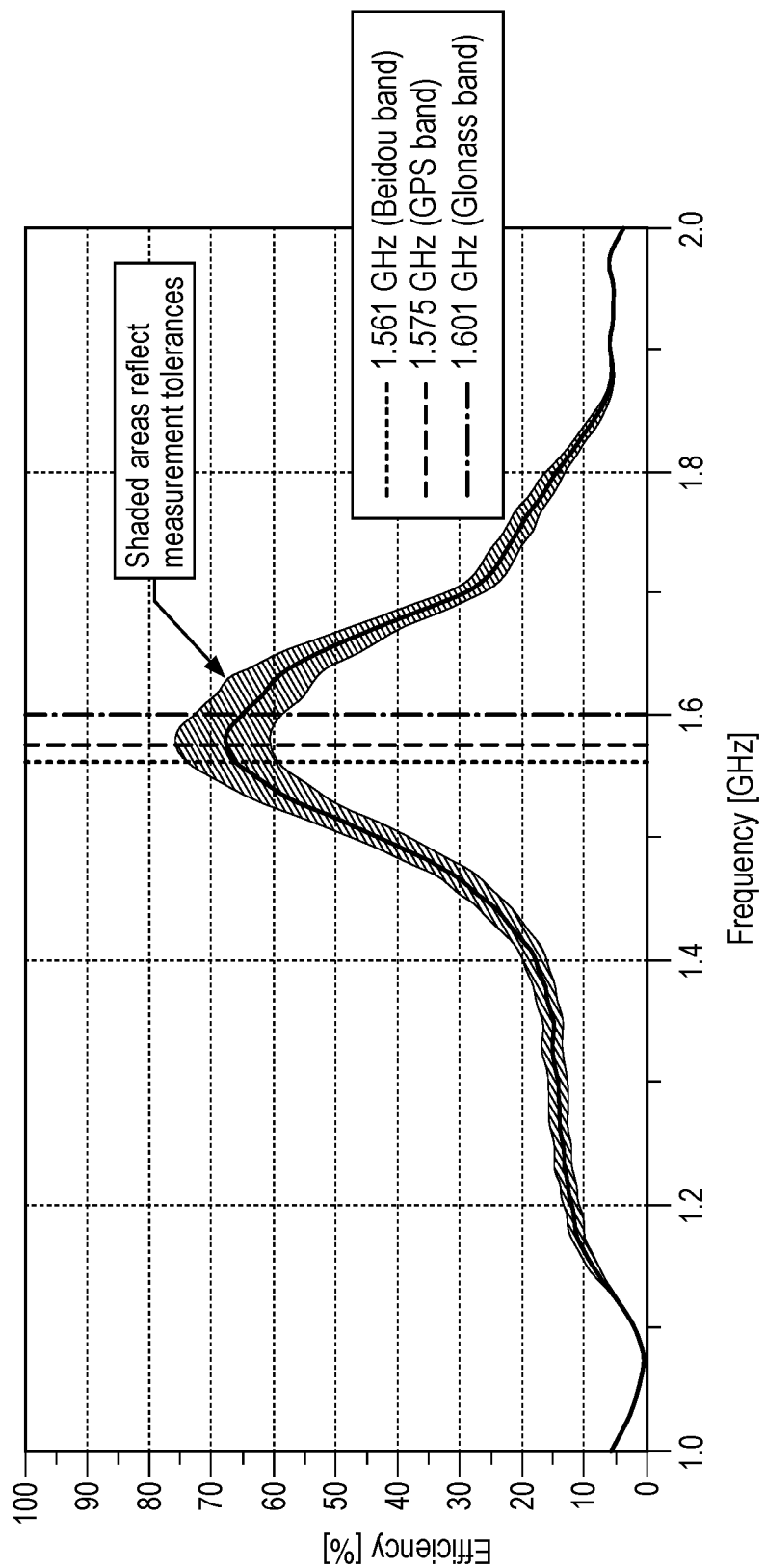
Figure 6:
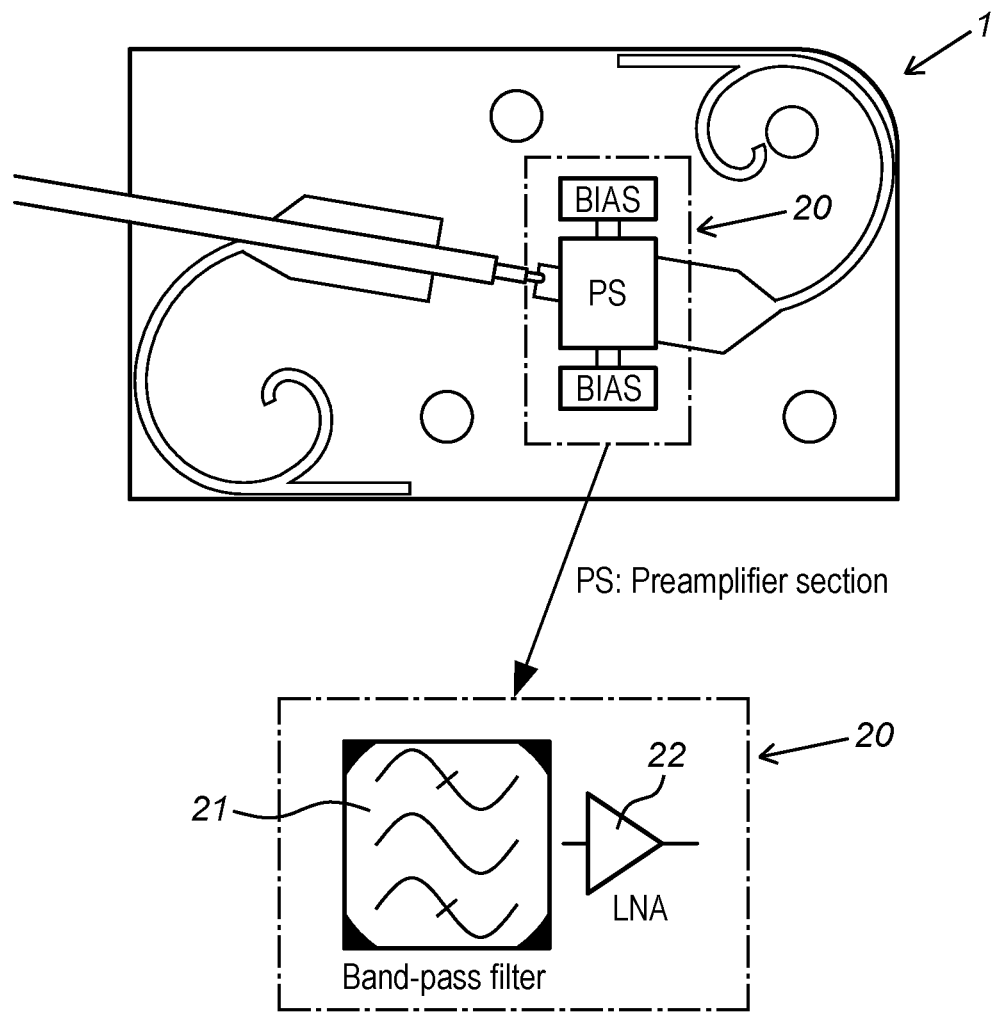
Figures 7A, 7B:
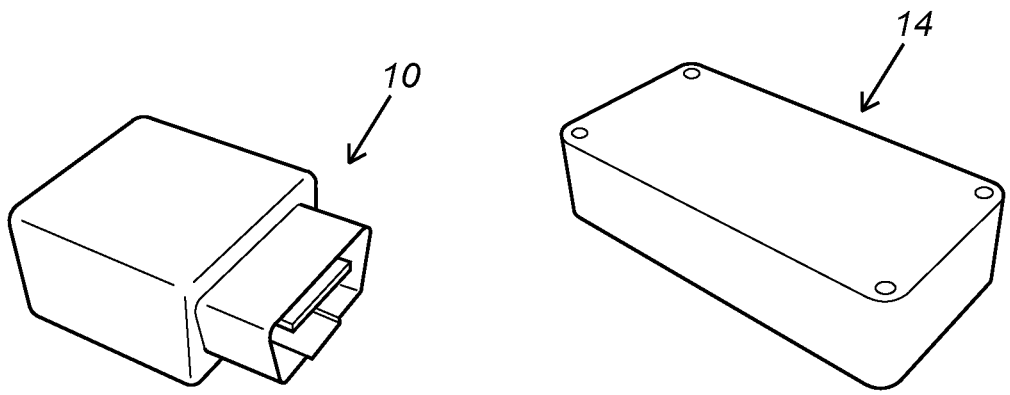
Figure 8A:
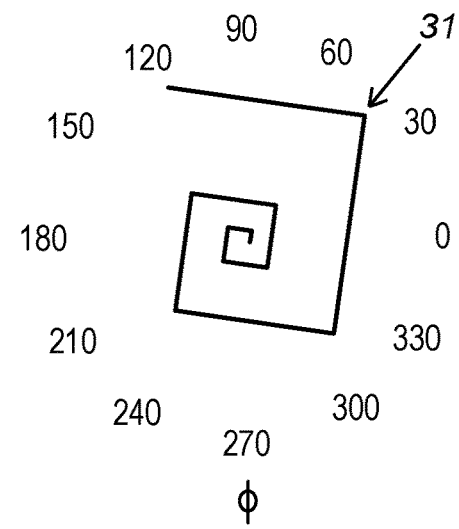
Figure 8B:
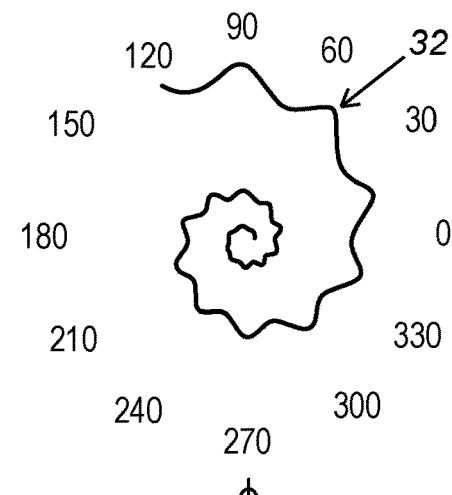
Figure 9:
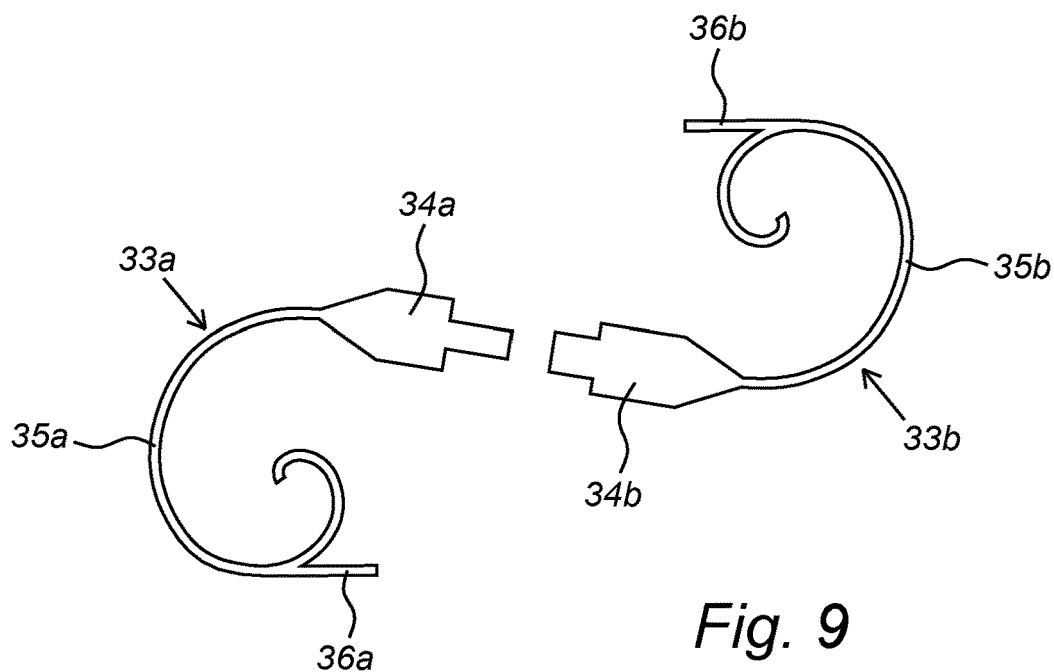

FIGS. 3a-f show graphs of the simulated performance of a GNSS antenna according to FIGS. 1a and 1b;

FIGS. 4a-c show the measured performance of a GNSS antenna according to FIGS. 1a and 1b;

FIGS. 5a-d show the experimental results of the return loss performance of a plurality of variants based upon a GNSS antenna according to FIGS. 1a and 1b;

FIG. 6 show a schematic representation of another GNSS antenna according to the invention;

FIGS. 7a and 7b show possible embodiments of GNSS modules according to the invention;

FIGS. 8a and 8b show different representations of spiral-shaped designs to be applied in a GNSS antenna according to the invention; and FIG. 9 shows a schematic representation of a part of another GNSS antenna according to the invention.

FIG. 1a shows a top view, and 1b shows a bottom view of a GNSS antenna (1) according to the invention. FIG. 1a shows the front surface of a dielectric support substrate (2), whereas FIG. 1b shows the rear surface of the support substrate (2). There are two radiation structures (3a, 3b) attached to the front surface of said support substrate (2), each radiation structure (3a, 3b) comprising a feeding section (4a, 4b) configured to be connected to an external feeding structure (8) formed by a coaxial cable, and a substantially spiral-shaped section (5a, 5b) connected to said feeding section (4a, 4b). The feeding sections (4a, 4b) of the radiation structures (3a, 3b) are facing each other and are positioned at a distance from each other. Furthermore, each radiation structures (3a, 3b) comprises a fine frequency tuning branch (9a, 9b) connected to the substantially spiral flares (5a, 5b). The presented configuration shows linear fine frequency tuning branches (9a, 9b). FIG. 1b shows a parasitic structure (6) attached to the rear surface of said support substrate (2). The support substrate (2) comprises furthermore multiple fixing through-holes (7a, 7b, 7c) for allowing mechanically fixing of the GNSS antenna (1) to another object, such as a housing as shown in FIG. 2.

FIG. 2 shows an exploded view of a GNSS module (10) comprising the GNSS antenna (1) as shown in FIG. 1. The GNSS module (11) moreover comprises a housing (11) for mounting said GNSS antenna (1). The module (10) provides good isolation from other antennas, such as a GSM antenna (12), coexisting in the same housing (11). The housing (11) is provided with an electrical connector (13) connected to one or both antennas (1, 12), which makes the GNSS module (10) as such suitable to be used as plugin module, for example for vehicles.

Figure 3A:
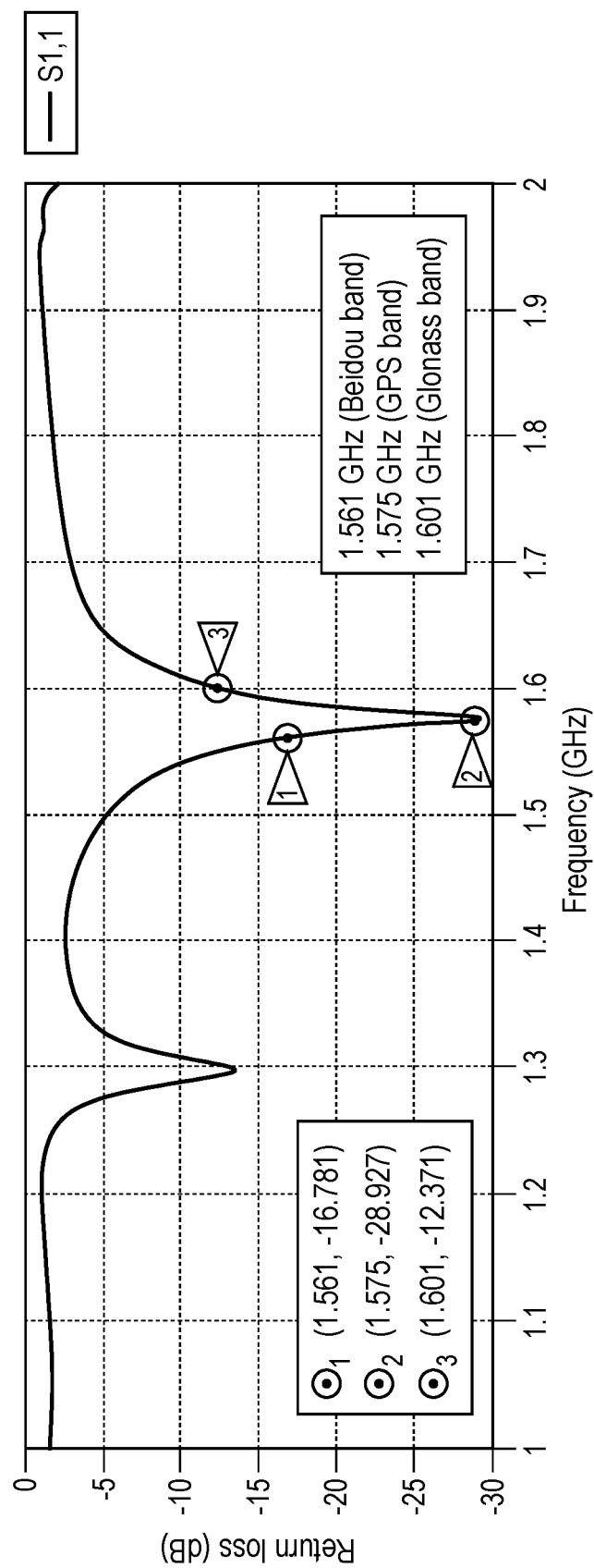
Figure 3B:
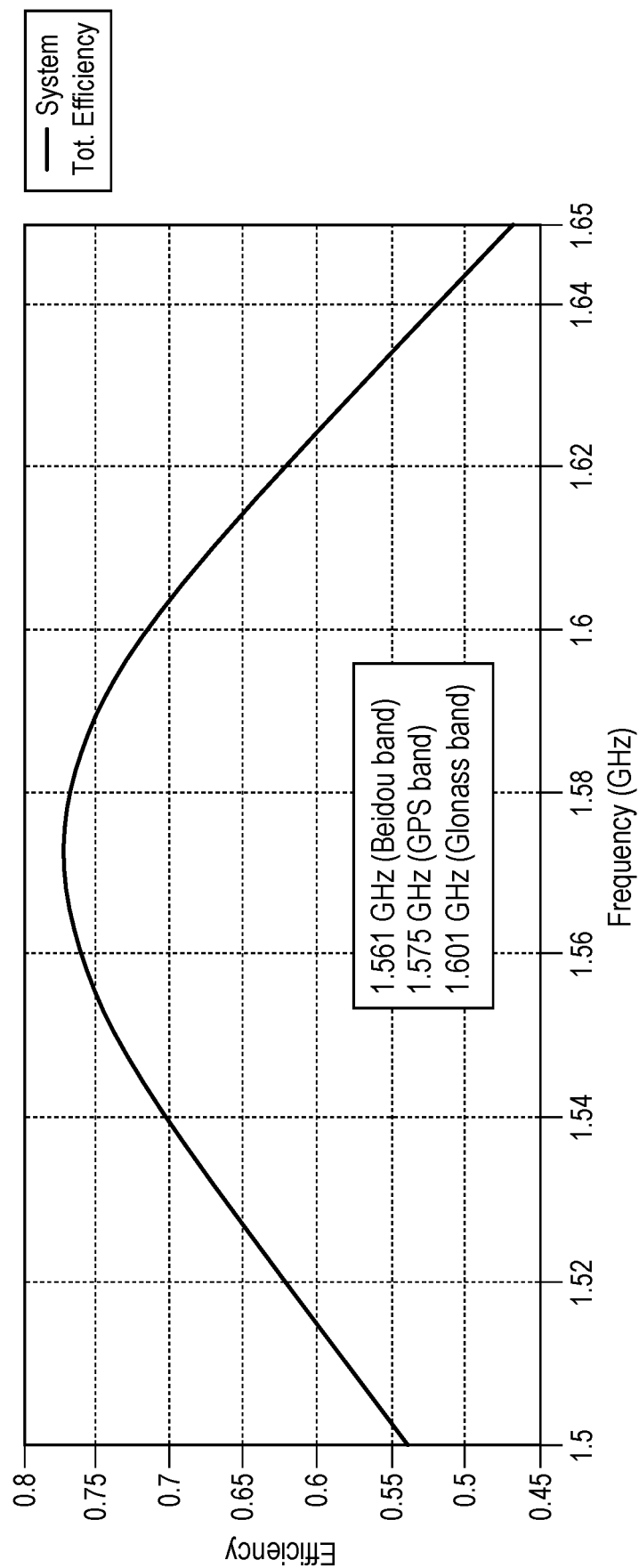
Figure 3C:
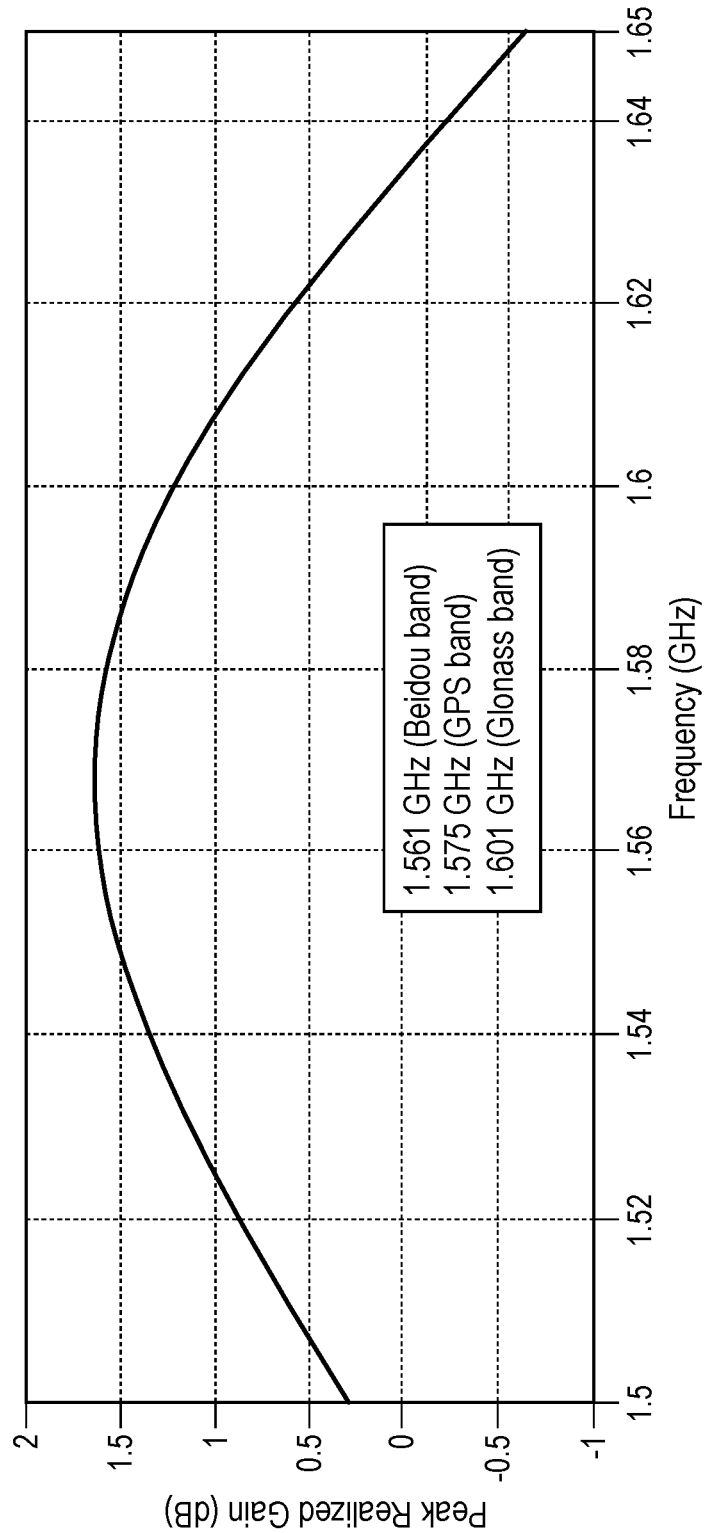
Figures 3D, 3E, 3F:
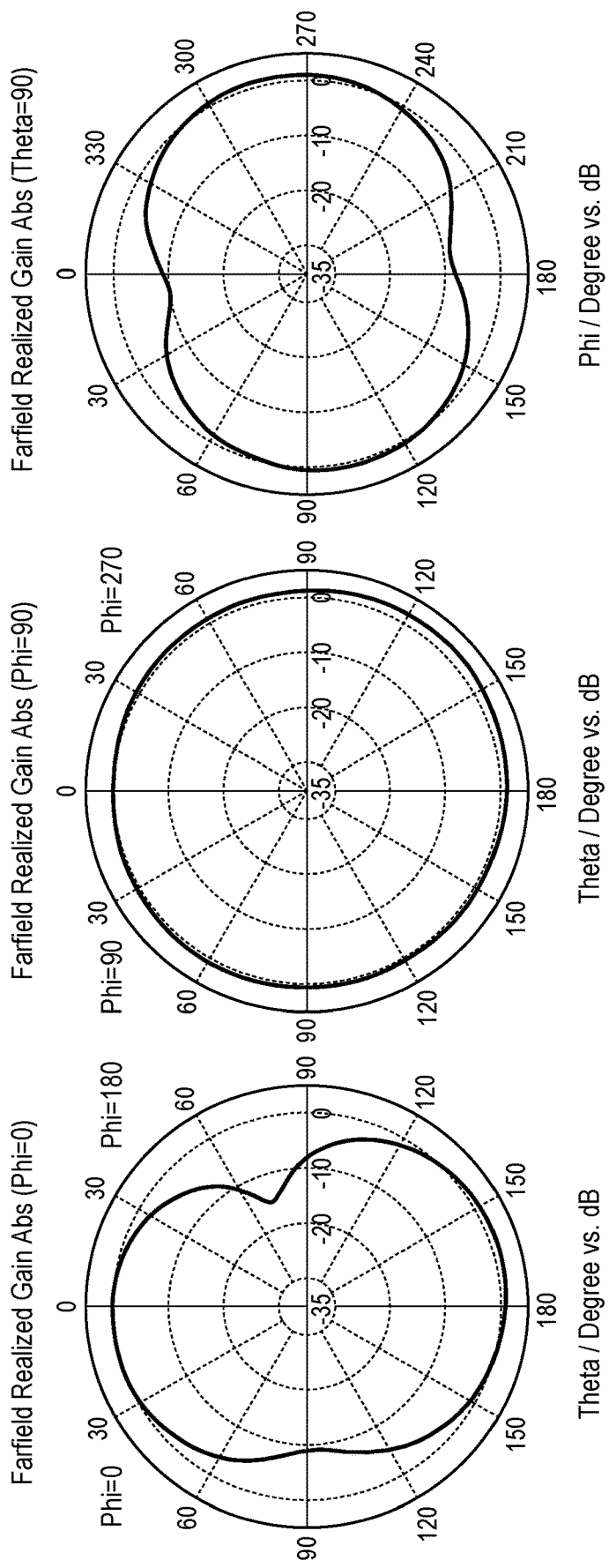

FIGS. 3a-f show graphs of the simulated performance of a GNSS antenna according to one of FIGS. 1a-2. Herein, FIG. 3a shows a graph showing the impedance matching performance of the GNSS antenna. The x-axis showing the frequency in GHz, and the y-axis showing the return loss in dB. A return loss of at least −15 dB can be obtained in the Beidou and the GPS bands, and a return loss of −10 dB in the Glonass band. FIG. 3b shows a graph of the systems total efficiency of the same GNSS antenna. The efficiency versus the frequency (GHz) is plotted and shows a clear radiation uniformity over the operational frequency band. FIG. 3c shows a graph of the peak realized gain (dB) versus the frequency (GHz). The graph shows a clear radiation uniformity over the operational frequency band. FIGS. 3d-f show the omnidirectionality of the GNSS antenna in the relevant radiation plane cuts, for a frequency of 1.575 GHz. The graphs show a relatively uniform and relatively omnidirectional radiation patterns in the phi=0 degrees plane, the phi=90 degrees plane, and the theta=90 degrees plane. Omnidirectionality is commonly requested due to the conditions of the operational environment.

FIGS. 4a-c show the measured performance of a GNSS antenna as shown in FIGS. 1a-2. More in particular, FIG. 4a shows the embedded voltage standing wave ratio of the antenna inside the GNSS module (10) versus the frequency (GHz). The graph shows an excellent matching performance. FIG. 4b shows the peak realized gain (dB) versus the frequency (GHz), whereas can be seen that the GNSS antenna has a good peak performance and radiation uniformity. The shaded areas of the graph reflect measurement tolerances. FIG. 4c shows the total efficiency performance of GNSS module (10). The efficiency in percentage is plotted against the frequency (GHz). The graph clearly shows a relatively good uniformity of the radiation.

Figure 5A:
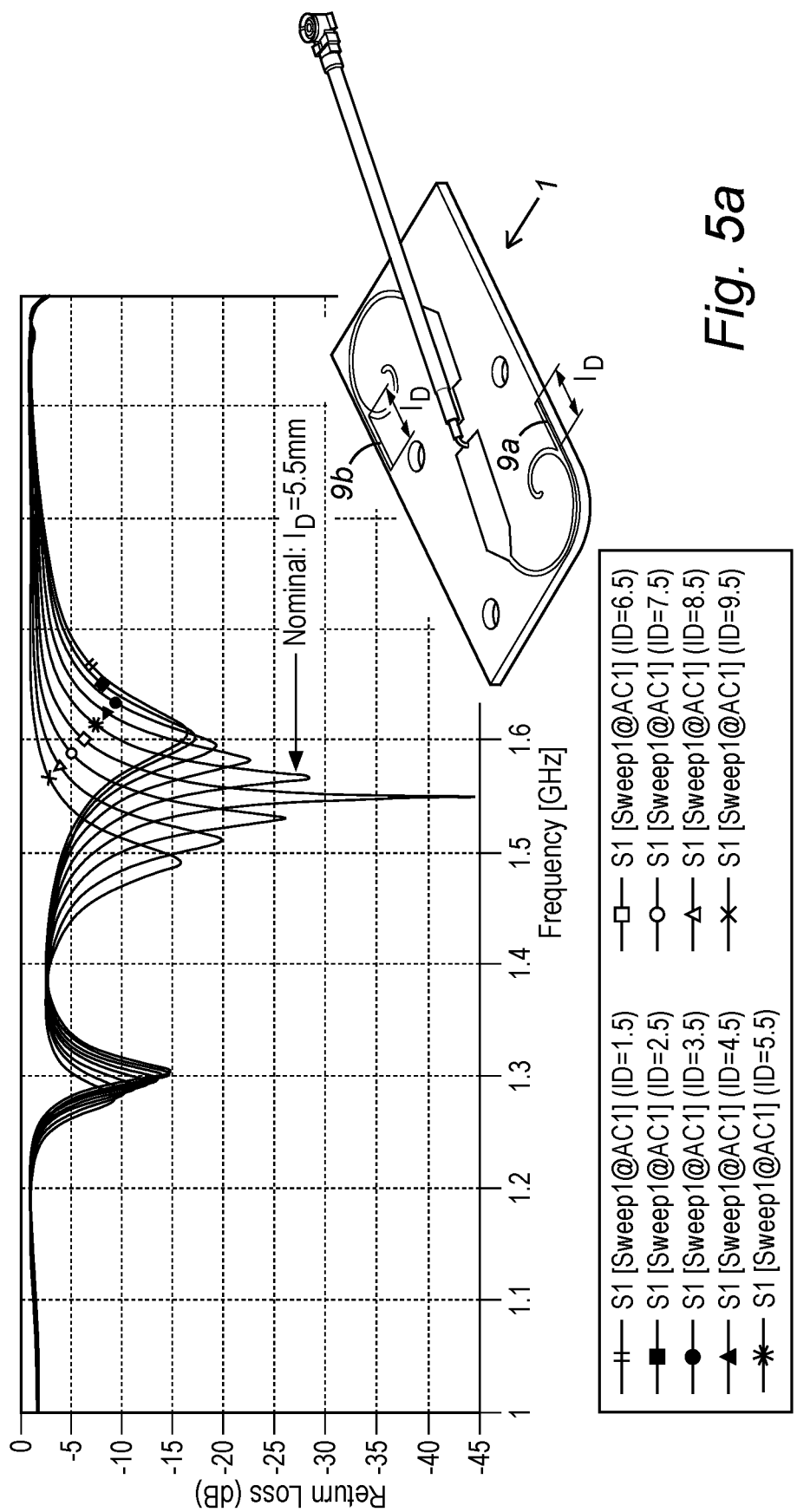
Figure 5B:
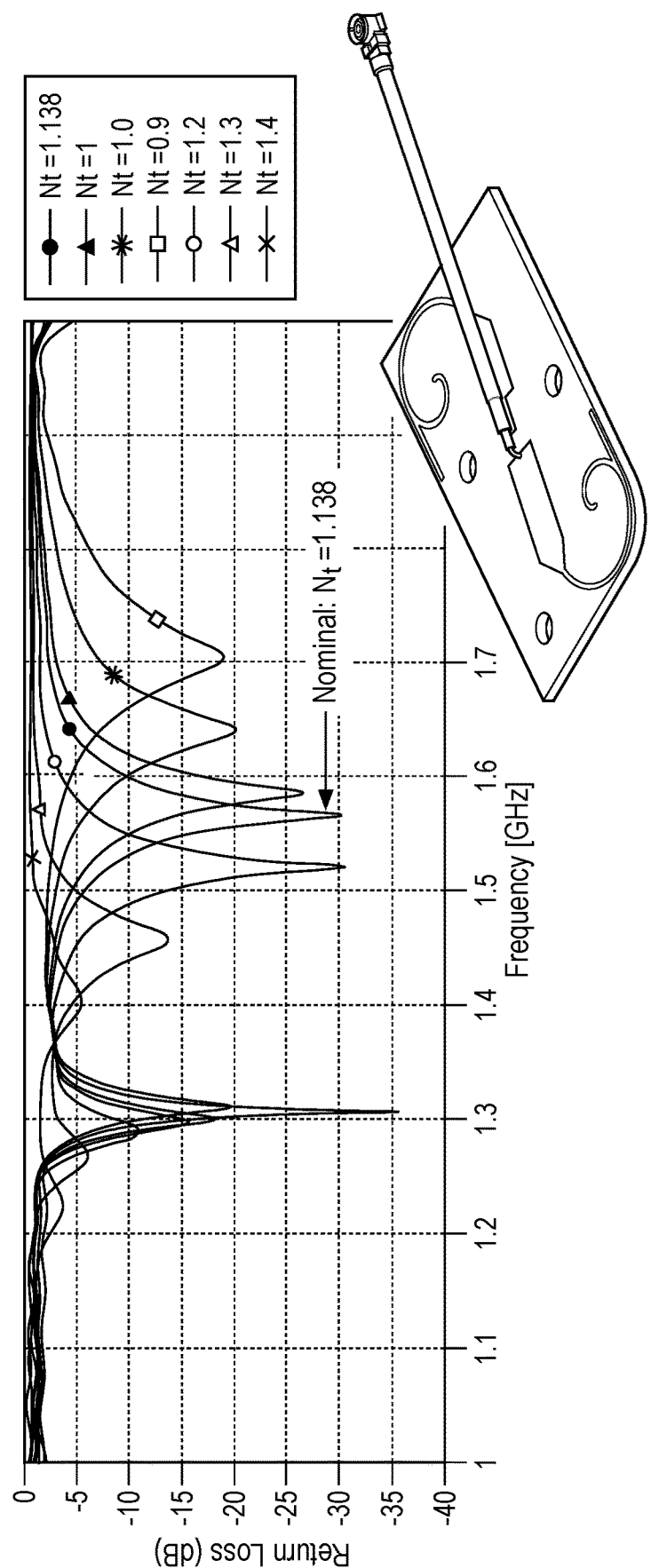
Figure 5C:
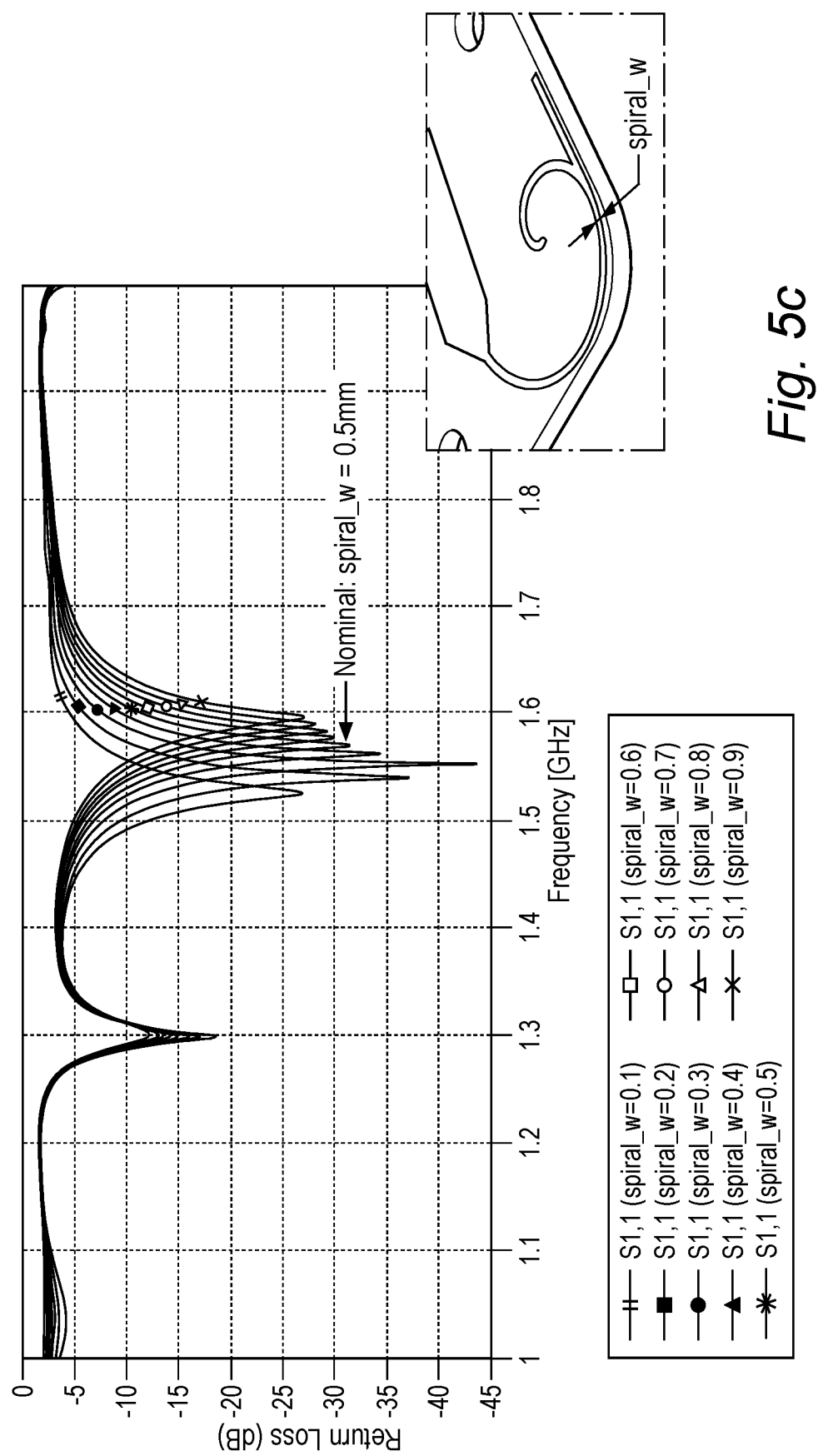
Figure 5D:
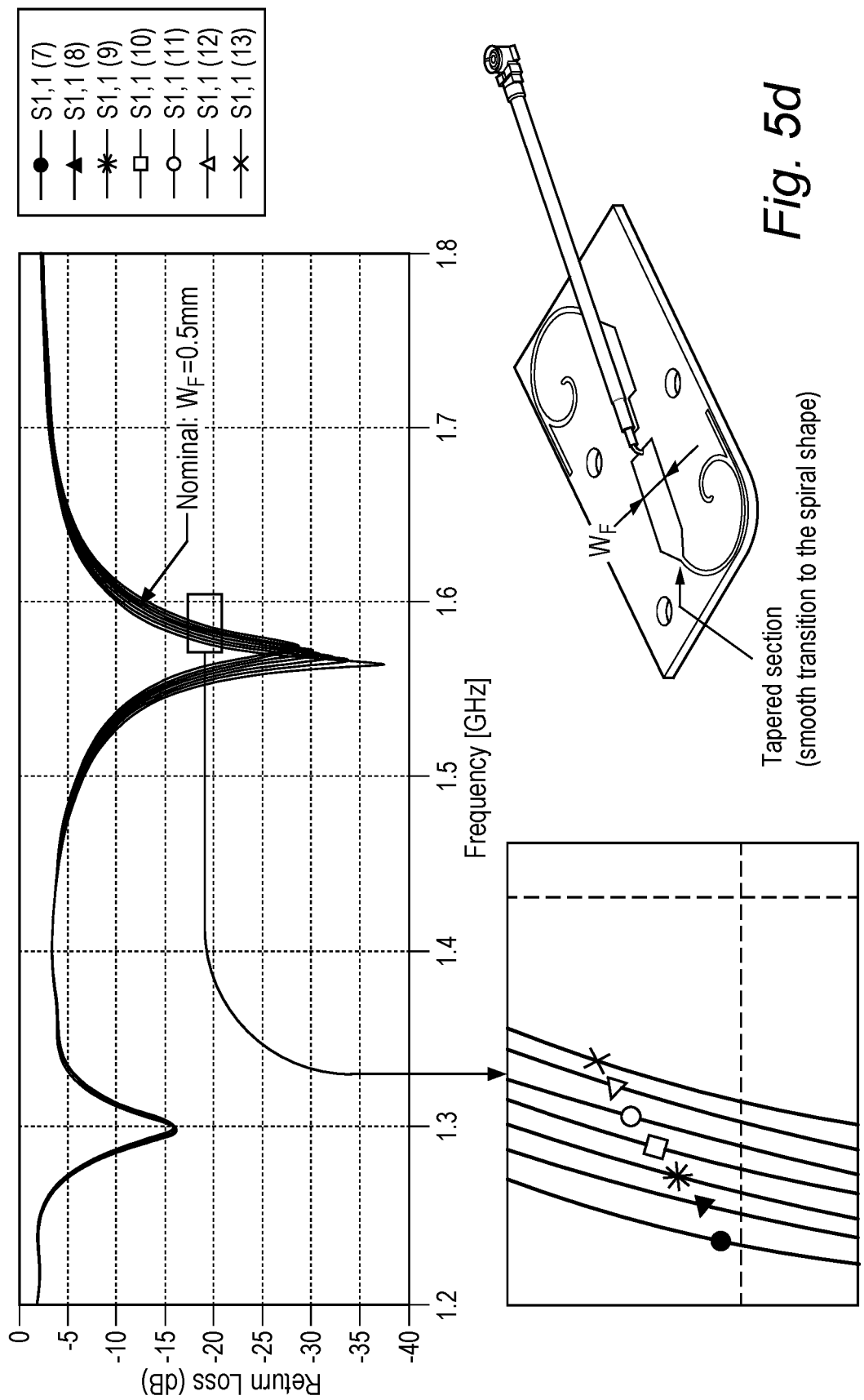

FIGS. 5a-d show the experimental results of the return loss performance of different variant of a GNSS antenna shown in FIGS. 1a-2. All of these figures show the return loss (dB) versus the frequency (GHz). FIG. 5a shows the results of an experimental study on the length ($l_D$) of the fine frequency tuning branches (9a, 9b) of a GNSS antenna (1). FIG. 5b shows the return loss performance related to the number of spiral windings ($N_t$) of each substantially spiral-shaped section (5a, 5b). FIG. 5c shows the influence of the width ("spiral_w") of the spiral on the return loss performance, whereas FIG. 5d shows the influence of the width ($W_F$) of the feeding section (4a, 4b) on the return loss performance.

FIG. 6 shows a possible configuration of an active GNSS antenna (1) according to the invention. The passive antenna as shown in FIGS. 1a-2 is turned in an active configuration by properly inserting a pre-amplification stage (20) consisting of a low-noise amplifier (LNA) (22) and a pass-band filter (21). This configuration allows combining the benefit of a larger C/N ratio with the better uniformity of radiation that characterizes the GNSS antenna solution in comparison to, for example, pre-amplified ceramic patch antennas. This uniform radiation allows to easily lock a bigger number of satellites for operation.

FIG. 7a shows a perspective view of the GNSS module (10), as shown in FIG. 2, in a closed (assembled) state. FIG. 7b shows a different embodiment of a GNSS modules (14) comprising a GNSS antenna according to the invention. As shown the GNSS module (14) according to FIG. 7b has different geometrical parameters compared to the GNSS module (10) as shown in FIG. 7a. The GNSS antenna(s) according to the invention used in each GNSS module (10) is ideally suitable to be integrated with different GNSS plugin modules (10). The modules (10) can be battery powered (FIG. 7b) and/or connected via an external power source. The GNSS modules (10, 14) may be substantially watertight to shield the GNSS antenna(s) from moisture.

FIGS. 8a and 8b show different mathematical and graphical representations of spiral-shaped designs (31, 32) to be applied as substantially spiral-shaped section in a GNSS antenna according to the invention, calculated via Gielis transformations for given parameters.

FIG. 9 shows a schematic representation of a part of a GNSS antenna according to the invention, and in particular two radiation structures (33a, 33b) of said GNSS antenna. Each radiation structure (33a, 33b) comprises a feeding section (34a, 34b) and a substantially spiral-shaped section (35a, 35b) with a fine frequency tuning branch (36a, 36b) connected to said feeding section (34a, 34b). Each feeding section (34a) has a free outer end with a reduced width, wherein an opposite end of said feeding section (34a) has a tapered design in order to be able to smoothly connect to the substantially spiral-shaped sections (35a, 35b).

It will be apparent that the invention is not limited to the exemplary embodiments shown and described here, but that within the scope of the appended claims numerous variants are possible which will be self-evident for the skilled person in this field. It is possible here to envisage that different inventive concepts and/or technical measures of the above described embodiment variants can be wholly or partially combined without departing from the inventive concept described in the appended claims.

The verb "comprise" and conjugations thereof used in this patent publication are understood to mean not only "comprise", but are also understood to mean the phrases "contain", "substantially consist of", "formed by" and conjugations thereof.

The invention claimed is:

1. GNSS antenna, comprising:
   at least one dielectric support substrate having a front surface and a rear surface;
   at least two radiation structures attached to the front surface of said support substrate, each radiation structure comprising:
      a feeding section configured to connect to an external feeding structure, and
      at least one substantially spiral-shaped section connected to said feeding section,
   wherein the feeding sections of the radiation structures are facing each other, and wherein the at least two radiation structures are positioned at a distance from each other; and
   preferably, at least one parasitic structure attached to the rear surface of said support substrate,
   wherein the substantially spiral-shaped section of at least one radiation structure has a shape of a polynomial spiral, for which the curvature changes preferably substantially linearly with an arc length,
   wherein the spiral-shaped sections of the at least two radiation structures are facing away from each other; and
   wherein a rotation of a radius vector of the polynomial spiral complies with the formula:

$$\varrho(\vartheta) = \frac{1}{\sqrt[n_1]{\left|\frac{1}{A}\cos\left(\frac{m}{4}g_1(\vartheta)\right)\right|^{n_2} \pm \left|\frac{1}{B}\sin\left(\frac{m}{4}g_2(\vartheta)\right)\right|^{n_3}}} f(\vartheta)$$

wherein:
$A, B, n_1 \in \mathbb{R}_0^+; m, n_{1,2} \in \mathbb{R}$; and $f(\vartheta) = e^{b\vartheta}$ 2. GNSS antenna according to claim 1, wherein the design of the at least two radiation structures is substantially identical.

3. GNSS antenna according to claim 1, wherein the at least two radiation structures together form a layout, said layout having an n-fold rotational symmetry, wherein n≥2.

4. GNSS antenna according to claim 1, wherein a substantially spiral-shaped design of each radiation structure has a smooth curvature.

5. GNSS antenna according to claim 1, wherein a substantially spiral-shaped section of at least one radiation structure has the shape of a polynomial spiral for which the curvature changes substantially periodically with the arc length.

6. GNSS antenna according to claim 1, wherein at least one radiation structure comprises at least one fine frequency tuning branch connected to the substantially spiral-shaped section of said radiation structure.

7. GNSS antenna according to claim 1, wherein the maximum diameter of the substantially spiral-shaped section of at least one radiation structure is situated between 8 and 9 mm.

8. GNSS antenna according to claim 1, wherein a maximum width of the feeding section of at least one radiation structure is larger than the width of the substantially spiral-shaped section of said radiation structure.

9. GNSS antenna according to claim 1, wherein a width at least a part of the feeding section of at least one radiation structure decreases in the direction of the substantially spiral-shaped section of said radiation structure.

10. GNSS antenna according to claim 1, wherein the at least one parasitic structure comprises a substantially linear section and at least one substantially spiral-shaped structure to each end of said linear section.

11. GNSS antenna according to claim 10, wherein a design of at least one substantially spiral-shaped structure of the parasitic structure substantially corresponds to a design of the substantially spiral-shaped structure of at least one radiation structure.

12. GNSS antenna according to claim 1, wherein the at least one parasitic structure is substantially completely made of at least one electrically conductive material, preferably made at least one metal.

13. GNSS antenna according to claim 1, wherein the GNSS antenna comprises more than two radiation structures.

14. GNSS antenna according to claim 1, wherein the radiation structures allow the GNSS antenna to operate in different frequency bands, preferably at least one GNSS frequency band and at least one frequency band chosen from the group consisting of: the Cellular GSM frequency band, LTE frequency band, WCDMA frequency band, and/or Wi-Fi frequency band.

15. GNSS module, comprising at least one GNSS antenna according to claim 1, and at least one housing for mounting said GNSS antenna.

16. Vehicle comprising at least one GNSS module according to claim 15.

17. GNSS antenna according to claim 1, wherein the at least two radiation structures are mutually separated, wherein each radiation structure, at least the spiral-shaped sections thereof, is attached to a different region of the front surface of said support substrate.

18. GNSS antenna according to claim 1, wherein the spiral-shaped sections of the at least two radiation structures substantially extend in different directions of the front surface of said support substrate.

* * * * *